Sept. 15, 1970

F. J. DOUGHTY 3,528,825

SHRINK WRAPPED SHIRRED CASINGS

Filed Dec. 4, 1967

INVENTOR.
FREDERICK J. DOUGHTY
BY William G. Hopley 3,528,825
SHRINK WRAPPED SHIRRED CASINGS
Frederick James Doughty, Lindsay, Ontario, Canada, assignor to Union Carbide Canada Limited, Toronto, Ontario, Canada, a company of Canada
Filed Dec. 4, 1967, Ser. No. 687,789
Int. Cl. A22c *13/00;* B65b *31/00*
U.S. Cl. 99—176          3 Claims

ABSTRACT OF THE DISCLOSURE

A wrapped shirred casing comprising an outer covering of non-shirred casing shrunk snugly about a shirred casing to reduce longitudinal expansion of the shirred casing; the non-shirred casing having a tear-away strip for easy removal.

---

This invention relates to a novel wrapped meat casing article, to a method for making such an article and to packages of such articles. More particularly, the invention relates to a wrapped stick of shirred meat casing of flexible tubing, to a method of making such a wrapped stick and to packages of such sticks.

The use of flexible tubing for casing meat products such as frankfurters and sausages is well known. Such tubing can be formed from materials such as proteins and carbohydrates, for example, collagen, alginates, starches and cellulosic materials such as cellulose esters, cellulose ethers and regenerated cellulose, as well as from other natural and synthetic materials.

Many such tubular casings are used in shirred form and, merely by way of illustration, the invention will be described with particular reference to the use of shirred regenerated cellulose casings suitable for use in the manufacture of skinless frankfurters. In the manufacture of such products, regenerated cellulose tubing of an appropriate length, for example, 55 feet, 84 feet, 110 feet or more, is shirred and then compressed to produce what is referred to in the art as a "shirred casing stick." Such casing sticks generally has a length of from about nine inches to about twenty inches. It is usually preferred to maintain the moisture content of such tubular casing at a relatively low level of from about 7% to about 12% by weight based on the total weight of the moist casing during the shirring operations.

In forming a frankfurter or like product using such a shirred casing stick, comminuted meat emulsion is fed under pressure through a stuffing horn into such a shirred casing stick which has been sheathed onto the stuffing horn. For optimum stuffing performance, it is desirable for the casing stick to have a moisture content during the stuffing operation of more than about 12% but less than about 20% and preferably of from about 14% to about 16% by weight, based on the total weight of the moist shirred casing stick. This requirement applies particularly in the case of automatic stuffing operations as distinct to manual stuffing operations.

Since it is preferred to maintain the moisture content of the casing stick at a low level for the shirring operation but at a higher level during the subsequent stuffing of the shirred stick, it has been customary to package such shirred casing sticks in packages or cartons referred to in the art as "caddies." Such caddies are provided in their vertical end panels with openings through which external humid air can be passed to enter the caddy, circulate through and between the shirred casing sticks and so humidify the sticks contained therein to the desired extent. The shirred casing sticks, after being suitably humidified, are maintained at the desired moisture content by wrapping the caddy with a wax-treated paper or other suitable moisture-impervious material.

In conventional stuffing operations, it is preferred to deshir the shirred casing sticks in a direction opposite to that in which they were shirred. In order to ensure that the sticks will be stuffed in the correct direction, it is known to provide directional arrows on the side and/or top panels of the caddies for the purpose of indicating the stuffing direction. The effectiveness of such indicating means is, of course, dependent on the stuffing machine operator remembering the direction of stuffing after he has removed a casing stick from the caddy. Many factors exist which increase the chance of error in this matter. There may be mentioned, for example, operator fatigue and forgetfulness, distraction and other incidents.

A further problem which is well known in the conventional use of packaging caddies arises from the fact that the compressed casing longitudinally expands during storage from its original shirred and compressed length. Such expansion is even greater after humidification of the shirred casing stick but is restricted by the vertical end panels of the caddy. As a result of this expansion, it is necessary to construct the caddies in a relatively strong manner so that they will not be damaged by such expansion forces. Further difficulties arise due to the expanded sticks becoming tightly wedged between the vertical end panels of the caddy and it consequently requires considerable care in removing the sticks from a caddy to avoid damaging them. Such risk of damaging the casing sticks is greater with the longer sticks which are preferred for modern automatic stuffing operations.

It will be appreciated that, although the use of shirred casing sticks and the concomitant use of caddies is well established in the food industry, such operations present certain difficulties and inconveniences as well as substantial risk of the casing sticks being damaged. Such damage results in turn not only in wastage of materials but also lowers stuffing productivity considerably by reducing the effective stuffing rate of a stuffing machine and its operator.

It is a principal object of the present invention to provide wrapped shirred casing sticks which serve to facilitate the production of frankfurters and similar stuffed articles.

It is a further object of the invention to provide a method for forming such wrapped shirred casing sticks.

It is yet another object of the invention to provide packages of wrapped shirred casing sticks which are useful in such production of frankfurters and like products.

These and other objects of the invention are achieved by providing a shirred casing stick having an outer covering of non-shirred casing shrunk snugly thereabout. Such a wrapped shirred casing stick can be produced by inserting a shirred casing stick into a non-shirred length of shrinkable casing and then exposing the non-shirred casing to such conditions that it shrinks snugly about the shirred casing stick.

It will be appreciated that the provision of an outer wrapping in this manner about a shirred casing stick will serve to reduce considerably the danger of such a stick being damaged during handling, particularly during introduction of the sticks into a package and during their removal therefrom, as well as during the sheathing of the sticks on to a stuffing horn. As a result of such increased stick durability, the invention permits rougher handling of the sticks and may even allow sticks of increased length to be handled satisfactorily.

It will further be appreciated that, as a result of the snug fit of the outer non-shirred casing around the shirred casing stick, the tendency of the latter to undergo longitudinal expansion will be considerably reduced. Consequently, the possibility of the shirred sticks becoming very firmly wedged between the vertical end panels of a caddy or carton will be significantly reduced and, in turn, the sticks will be more readily removable from such a caddy or carton. A further result of this reduced longitudinal expansion of the wrapped sticks is that there will be less force exerted against the vertical end panels of the caddy or carton and it will frequently be possible, as a result of this reduced force, to use caddies or cartons having a simpler and possibly less expensive construction.

By utilizing non-shirred casing of the correct diameter, the wrapped shirred casing stick obtained, although held snugly inside the length of non-shirred casing, can, if desired, be used as such in a conventional stuffing operation without removal of the non-shirred outer casing, the pressure applied to the meat emulsion serving not only to deshir the shirred casing stick but also to slide the latter out of the outer casing during the stuffing operation.

In accordance with a particularly useful embodiment of the present invention, the outer non-shirred wrapping casing is longer than the shirred casing stick contained therein so that the ends of the outer casing extend or project beyond the ends of the shirred casing stick. These projecting ends of the outer casing may then be secured about the ends of the shirred casing stick in a simple manner as, for instance, by means of a cord or string tied around the projecting ends of the outer casing. In this way, the aforementioned longitudinal expansion of the shirred stick may be further reduced and possibly even substantially completely eliminated and further simplification of the caddy or carton construction may be rendered possible. If the projecting ends of the outer casing are securely sealed, such complete enclosing of the shirred stick also serves to prevent contamination of the shirred stick as, for instance, by atmospheric dust. If the projecting ends of the outer casing are sealed in a moisture-tight manner and if there is used an outer casing formed of a water-impervious material, it is possible to prevent undesired variation of the moisture content of the shirred stick contained in such a casing.

In accordance with a further feature of the present invention, it is possible to utilize the hereinbefore described sealing of a shirred stick within a water-impervious outer casing to improve the production of shirred sticks having the desired moisture content for the stuffing operation. It is, for instance, possible to adjust the moisture content of the shirred stick to the value which is required for the stuffing operation or to any other desired value, by passing moist air through the wrapped shirred stick and then sealing the ends of the outer casing about the ends of the shirred stick. After such adjustment of the moisture content of a shirred stick, the shirred stick can be maintained in the sealed wrapped form until the time when it is to be stuffed. It will be appreciated that, by adopting such a procedure for adjusting the moisture content of a shirred stick, it becomes unnecessary to utilize the special caddies in which the moisture content of shirred sticks contained therein may be adjusted.

If the moisture content of a wrapped shirred casing stick is to be adjusted as previously described by passing moist air through the stick and then sealing the projecting ends of the outer casing, it will frequently be advantageous to utilize moist air at an elevated pressure for this purpose.

A further procedure which can be adopted in accordance with the present invention for adjusting the moisture content of a wrapped shirred casing stick is to introduce a predetermined volume of water into the outer casing and then seal the projecting ends of the outer casing. In such an operation, the moisture content of the shirred stick is able to reach equilibrium with the air contained in the outer casing during the time the wrapped shirred stick is stored, transported, etc.

It will be appreciated that the moisture content of a shirred casing stick can be effected immediately prior to the stuffing operation and that it is not essential to effect such adjustment in the manner hereinbefore described. If, however, such adjustment is effected after wrapping a casing in accordance with the invention, it is preferred to effect any adjustment of the moisture content of a shirred stick after the outer casing has been shrunk about the shirred stick particularly if the shrinking of the outer casing is effected by exposing the latter to water since such operation is likely to affect the moisture content of the shirred casing stick. It will further be appreciated that it is not essential to have any adjustment of moisture content in accordance with the invention.

Further beneficial results may, for instance, be obtained from wrapping shirred casing sticks in the manner described and further by indicating on the outer wrapping non-shirred casing the direction of stuffing as, for instance, by means of an arrow which can, for example, be printed or otherwise provided on the outer surface of the wrapping casing. By the provision of such an indication, the stuffing operator can have no doubt about the direction in which a stick should be sheathed on to the stuffing horn. He is not required to remember the instructions which were provided on the caddy. Information relative to the casing size and type can, of course, also be provided on the outer non-shirred casing.

Although, as previously explained, it is often possible to stuff the wrapped shirred casing sticks without stripping the wrapping casing therefrom, such outer wrapping casing may, if desired, be provided with a tear-away strip by means of which the outer casing may readily be stripped from the shirred casing stick prior to the actual stuffing operation.

The outer non-shirred casings used for wrapping shirred casing sticks in accordance with the invention may be formed from any suitable material. It will be appreciated that, if such an outer casing is to serve to prevent passage of moisture or moist air to or from the shirred stick, the outer casing material must then be formed of a material which is substantially impervious to moisture. If, on the other hand, the purpose of the outer casing is to prevent damage to the shirred stick during handling and/or to reduce longitudinal expansion of the shirred stick and/or to provide an indication of the stuffing direction, it will not then be essential for the outer casing to be formed from a water-impervious material.

The relative dimensions of the shirred casing stick and the outer non-shirred casing prior to shrinking will depend on several factors. If, for instance, it is desired to secure the projecting ends of the outer casing about the ends of the shirred casing stick contained therein either for the purpose of further reducing longitudinal expansion of the shirred casing stick or for the purpose of controlling the moisture content of the shirred casing stick, the outer casing will then need to have a length greater than the shirred casing stick. If it is not, however, desired to secure or seal such ends of the outer casing, the latter will not need to be longer than the shirred casing stick. With respect to the relative diameters of the shirred stick and the outer casing, it will be appreciated that these values will be determined with reference to the degree of shrinkage obtainable with the outer casing as well as to the tightness or snugness of the grip of the outer casing about the shirred casing stick which is desired. If for instance, it is desired to stuff the shirred stick without previously removing the outer non-shirred casing, it will then be necessary for the outer casing not to have too tight a grip on the shirred stick. It can in general be stated that the outer casing should have an internal diameter, prior to shrinking, such that the shirred casing stick can be inserted therein without difficulty but should not be so large that the outer non-shirred casing fails to grip the shirred casing stick snugly after the shrinking operation. By way of example, it may be mentioned that, using a regenerated cellulose non-shirred outer casing and a shirred casing stick having a diameter of about $22/_{32}$ inch, particularly satisfactory results were obtained when the internal diameter of the outer casing was about $^{27}\!/_{32}$ inch. The invention will find particular application in the wrapping of shirred casing sticks of flexible tubing having diameters ranging from ½ inch to 1½ inches with wall thicknesses ranging from 0.0006 inch or less to 0.003 inch or more.

The shrinking of the outer non-shirred casing about the shirred casing stick can be effected in any convenient manner and, in the case when such an outer casing can be shrunk by wetting it with water and then drying, such shrinking can be effected by simply immersing the wrapped stick in water and then drying it. In order to avoid upsetting the moisture content of the shirred casing stick, such exposure of the non-shirred outer casing to water for the purpose of shrinking it will generally be effected with the ends of the outer casing sealed to prevent entry of water to the shirred casing stick contained therein.

The invention will now be described by way of illustration with reference to the accompanying drawings in which.

Figure 3:
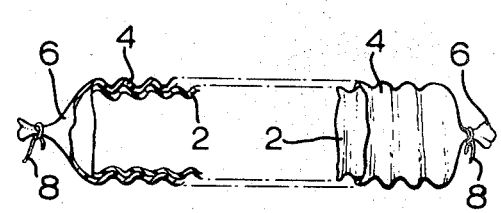
Figure 4:
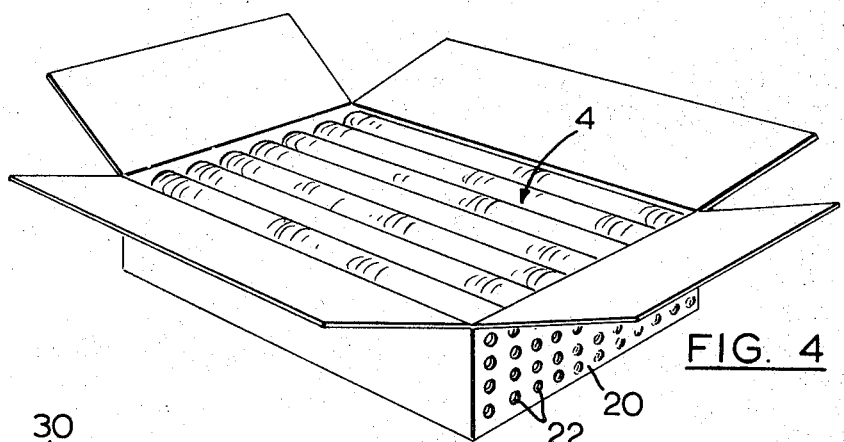
Figure 5:
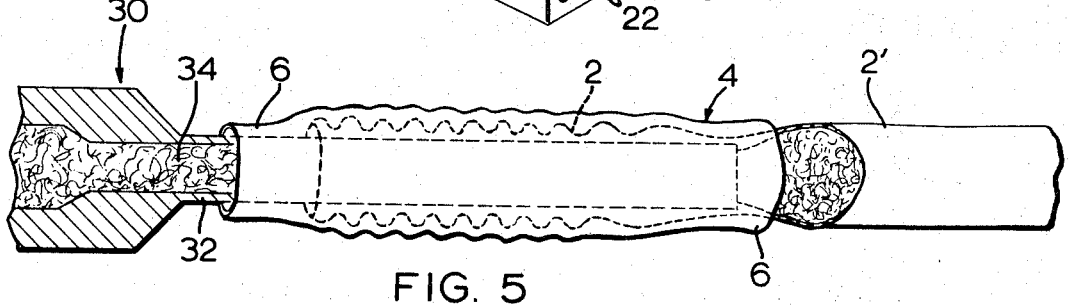

In the first stage of the manufacture of a wrapped FIG. 3 is a sectional view through a shirred casing stick contained within a non-shirred outer casing after the shrinking of the latter about the former;

FIG. 4 is a perspective view of several shirred casing sticks which have been wrapped with non-shirred outer casings in accordance with the invention showing the wrapped sticks disposed within a conventional casing stick caddy; and FIG. 5 is a perspective view, partly in section, showing the stuffing of a wrapped shirred casing stick according to the invention without prior removal of the outer casing for the purpose of showing the manner in which the shirred stick is simultaneously deshirred and slid from within the outer non-shirred casing during the stuffing operation.

Figure 1:
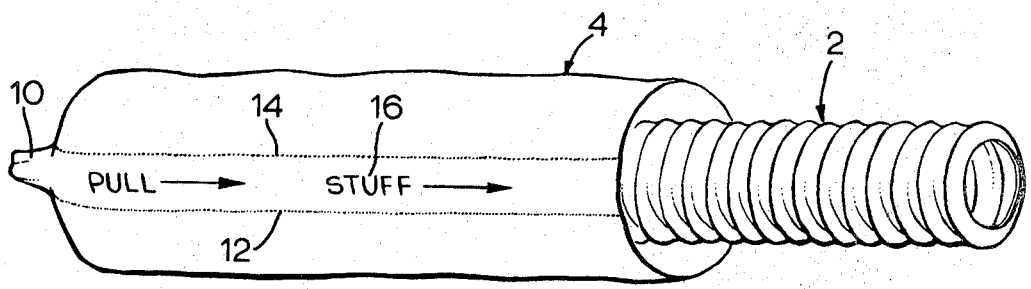
FIG. 1 is a perspective view of a shirred casing stick in the process of being inserted into a non-shirred outer casing as the first step in the packaging method of the present invention.

In the first stage of the manufacture of a wrapped shirred casing stick, as shown in FIG. 1, a stick 2 of regenerated cellulose casing is inserted into an outer wrapping 4 comprising a length of non-shirred regenerated cellulose casing or non-shirred shrinkable polyethylene film, such as the material manufactured by Union Carbide under the name Perflex S. It will be seen that the internal diameter of the wrapping casing 4 is slightly larger than the external diameter of the shirred casing stick 2.

Figure 2:
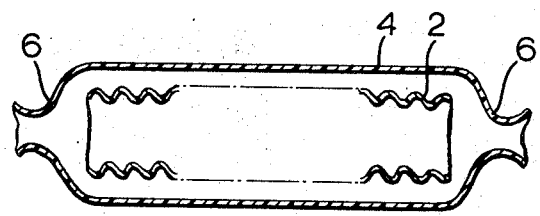
FIG. 2 is a sectional view through a shirred casing stick in place inside a non-shirred outer casing prior to the shrinking of the latter about the former.

After the shirred casing stick 2 has been fully inserted into the outer casing 4, the projecting ends 6 of the outer casing are secured about the ends of the shirred casing stick 2 by means of tie cords or strings 8. If desired, the untied ends may be twisted and inserted into the shirred stick 2. The final step in preparing a novel wrapped stick in accordance with the invention comprises shrinking the outer non-shirred casing 4 snugly about the shirred casing stick 2. This shrinking operation can be effected by immersing the wrapped stick, as shown in FIG. 2, into water and then allowing the outer casing 4 to dry. During such drying, the outer casing 4 shrinks to fit snugly about the peripheral surface of the shirred stick 2 as shown in FIG. 3. In its simplest embodiment, the outer casing 4 is not provided with end projections and the non-shirred outer casing 4 serves to protect the shirred casing stick from damage and to reduce longitudinal expansion of the stick during storage and transportation.

As previously stated, the invention may be applied to the wrapping of shirred casing sticks of varying diameters and wall thicknesses. By way of illustration, the shirred casing stick 2 shown in the drawings had a shirred length of 16¼ inches, an internal diameter of about ½ inch and an external diameter of about ⅞ inch. Such a stick of shirred casing can, for instance, be obtained by shirring a 95-foot length of $^{22}\!/_{32}$ inch inflated diameter casing having a wall thickness of .001 inch. For use with a shirred casing stick of such dimensions, particularly satisfactory results were obtained using an outer non-shirred casing 4 with a length of 20 inches, an inflated diameter of $^{27}\!/_{32}$ inch and a wall thickness of .001 inch. Using a shirred casing stick and an outer non-shirred casing with such dimensions, it was possible to slide the shirred stick readily by hand into the non-shirred casing and, after the shrinking operation, the shirred casing stick was snugly gripped by the shrunken casing.

It will be noted from FIG. 1 that the outer non-shirred casing 4 may, if desired, be provided with a tear-away strip having a projecting tab 10 and defined by score or perforation lines 12 and 14. Such lines may be provided in any other suitable manner. By the use of such a tear-away strip, the outer casing 4 can be readily stripped off the shirred casing stick 2. The stuffing direction for the shirred casing stick can be indicated in any convenient manner on the outer casing 4 as at 16 (FIG. 1).

When a stuffing machine operator wishes to use a wrapped shirred casing stick, he may simply untie or otherwise release the ends of the wrapped stick at 8, if the ends have been so tied, and then insert the stuffing horn into the shirred stick in the correct direction as indicated at 16. He may then, prior to the stuffing operation, strip the outer non-shirred casing 4 off the shirred casing stick 2 by means of the tear-away strip although, as will be more fully explained hereinafter, it is not essential to remove the outer casing 4 before the stuffing operation. Since the stuffing diection can be clearly indicated on the outer casing 4, there is very little possibility of the shirred stick 2 being sheathed on to the stuffing horn in the wrong direction.

After the outer non-shirred casing 4 has been shrunk around the shirred stick 2 to the form shown in FIG. 3, the wrapped stick may be packaged for storage or transportation. Since longitudinal expansion of the stick 2 during such storage or transportation is reduced both by the engagement of the outer peripheral surface of the shirred casing stick 2 with the inner surface of the outer non-shirred casing 4 and by the optional engagement of the ends of the shirred stick 2 with the tied ends 6 of the outer casing 4, use may be made of cartons, packages and caddies which have a weaker than usual vertical end panel construction.

A plurality of wrapped shirred casing sticks in accordance with the invention are shown in FIG. 4 disposed within a conventional caddy having a vertical end panel 20 with openings 22 provided therein. As previously explained, such openings 22 are provided for the purpose of adjusting the moisture content of shirred casing sticks contained in the caddy from the relatively low value at which the sticks are shirred to the higher value which is preferred for the stuffing operation.

The wrapped shirred casing sticks of the present invention may be packaged in such conventional caddies and, provided the wrapped sticks have not been sealed at their ends as indicated at 8 (FIGS. 2 and 3) or by alternative sealing means, adjustment of their moisture content may be effected in the usual manner by passing humid air through the ventilated caddy.

If, however, the outer casing 4 is longer than the shirred stick 2, as shown in FIGS. 1 and 2, to permit the ends of the outer casing 4 to be secured and sealed about the ends of the shirred stick 2, adjustment of the moisture content of the shirred stick 2 from the low shirring value to the higher value preferred for the stuffing operation can be effected by releasing the end ties 8 and passing moist air, preferably under pressure, through the wrapped stick. Alternatively, such adjustment of the moisture content of a wrapped stick can be effected by introducing a predetermined volume of water into the outer casing 4, after the shrinking operation.

After passage of moist air through the outer casing 4 and the shirred stick 2 for the required period of time or after the introduction of a predetermined quantity of water into the casing 4, the ends 6 of the outer casing 4 are re-sealed by tie strings 8 and the wrapped casing stick may then be packaged for storage or transportation in any carton or other suitable container. In such a case, it will, of course, be unnecessary to utilize the specially designed ventilated caddies of the type shown in FIG. 4. The reduced longitudinal expansion of the shirred sticks will further mean that such cartons or containers will not need to be constructed with such excessively strong vertical end panels.

Although the outer non-shirred casing 4 can be provided with a tear-away strip as shown in FIG. 1, it is not essential for the outer casing 4 to be removed from the shirred casing stick 2 prior to the stuffing operation since the stuffing operation itself may serve to strip the shirred casing stick 2 from the outer casing 4 during the deshirring of the stick. This will be more fully understood by reference to FIG. 5, from which it will readily be seen that the tie cords 8 have been removed from the projecting ends 6 of the outer casing 4 and that the shirred casing stick 2 together with the outer casing 4 has been sheathed on to a stuffing horn 32 of a conventional stuffing machine generally indicated at 30. The right-hand end (not shown) of the shirred stick 2 is plugged in any convenient manner and then the meat emulsion 34 is fed under pressure through the stuffing horn 32 into the shirred stick 2. The pressure of the meat emulsion serves to deshir the stick 2 as shown at 2' and simultaneously to slide the stick from inside the outer casing 4. The indicating arrow 16 provided on the outer casing 4 ensures that the wrapped shirred casing stick is sheathed on to the stuffing horn 32 in the correct direction.

I claim:
1. A method of packaging a shirred casing stick which comprises:

(a) inserting a shirred casing stick into a shrinkable length of non-shirred casing so that the ends of the non-shirred casing project beyond the ends of the stick,
(b) shrinking the non-shirred casing about the stick whereby longitudinal expansion of the stick is restricted by virtue of the engagement of the peripheral surface of the stick with the inner surface of said casing,
(c) adjusting the moisture content of the shirred casing stick within said non-shirred casing, and
(d) securing the projecting ends of the non-shirred casing whereby longitudinal expansion of the stick is further restricted by the engagement of the ends of the stick with the secured ends of the non-shirred casing.

2. The method of claim 1 wherein the moisture content of said shirred casing stick within said non-shirred casing is adjusted by introducing a predetermined volume of water into said non-shirred casing.

3 The method of claim 2 wherein said predetermined volume of water is introduced into said non-shirred casing after said shrinking of said non-shirred casing.

References Cited

UNITED STATES PATENTS

| 2,010,626 | 8/1935 | Dietrich | 99—170 |
| 2,181,329 | 11/1939 | Newitt | 99—175 |
| 2,298,779 | 10/1942 | Vogt | 99—174 |
| 2,967,383 | 1/1961 | Rumsey. | |
| 3,250,629 | 5/1966 | Turbak | 99—176 |
| 3,369,911 | 2/1968 | Witzleben | 99—176 |

FOREIGN PATENTS 942,207  11/1963  Great Britain.

FRANK W. LUTTER, Primary Examiner

R. HALPER, Assistant Examiner